June 18, 1957 H. G. NUTTER ET AL 2,795,875
SYSTEM AND TICKET DISPENSER FOR VEHICLE PARKING LOT
Original Filed May 14, 1953 10 Sheets-Sheet 1

INVENTOR.
HUGH G. NUTTER
BY
Barnes, Kisselle, Laughlin & Raisch
ATTORNEYS.

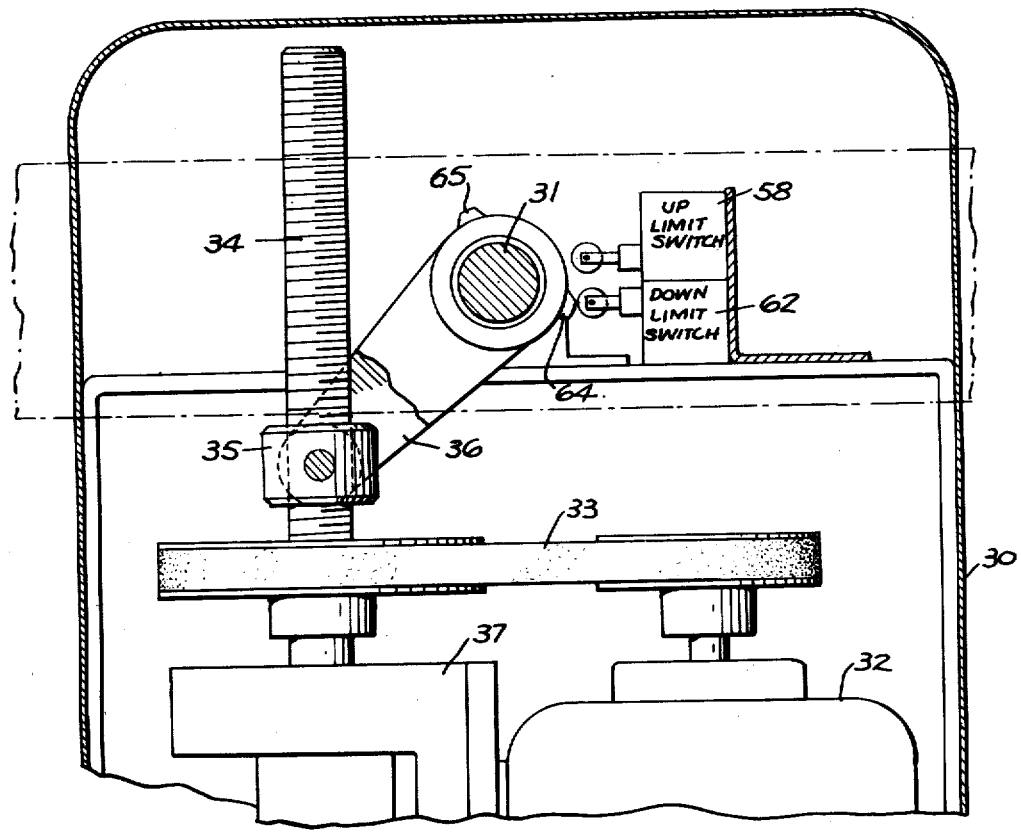
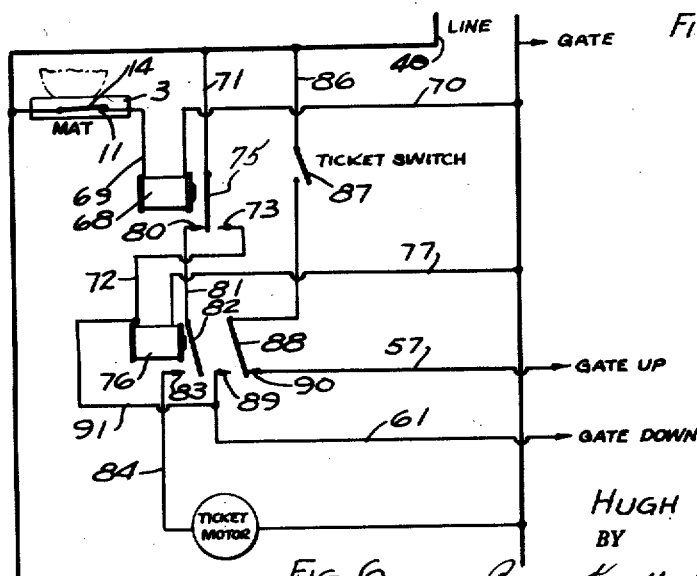

June 18, 1957 H. G. NUTTER ET AL 2,795,875
SYSTEM AND TICKET DISPENSER FOR VEHICLE PARKING LOT
Original Filed May 14, 1953 10 Sheets—Sheet 3
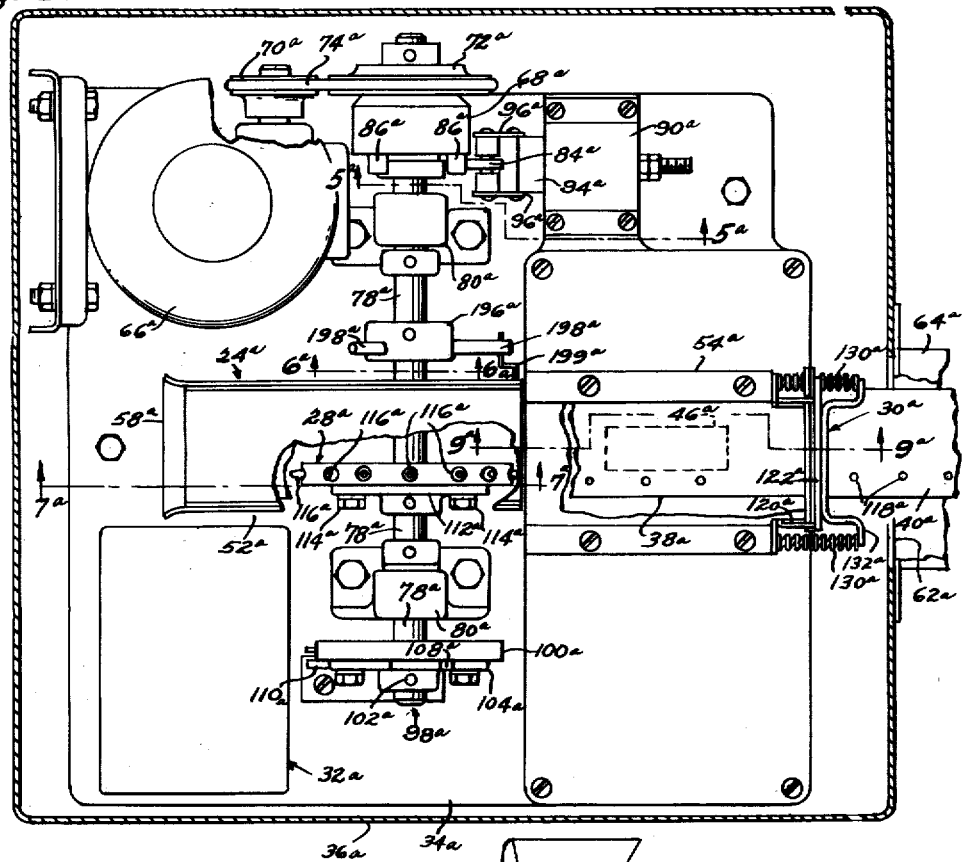
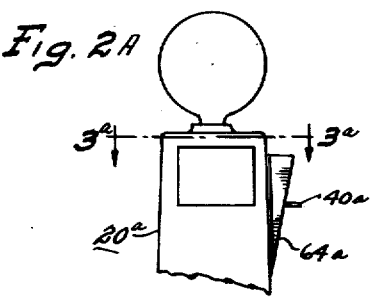
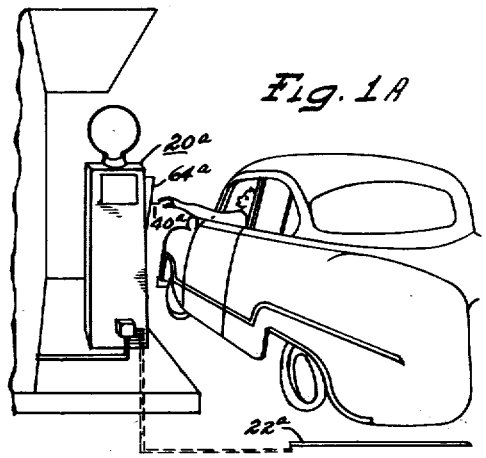
INVENTOR.
Harold L. Miller.
BY
Wallace P. Lamb
ATTORNEY.

INVENTOR.
HUGH G. NUTTER

June 18, 1957    H. G. NUTTER ET AL    2,795,875
SYSTEM AND TICKET DISPENSER FOR VEHICLE PARKING LOT
Original Filed May 14, 1953    10 Sheets-Sheet 5

INVENTOR.
Harold L. Miller.
BY
Wallace P. Lamb
ATTORNEY.

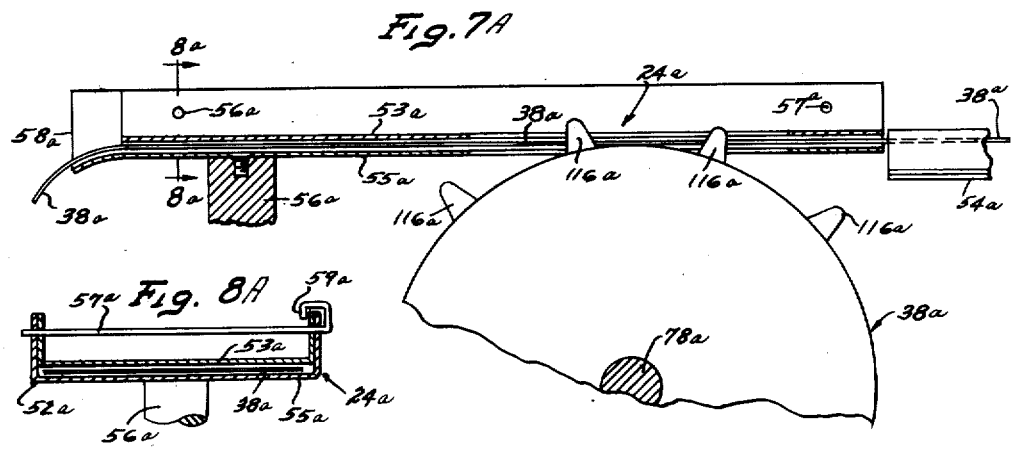
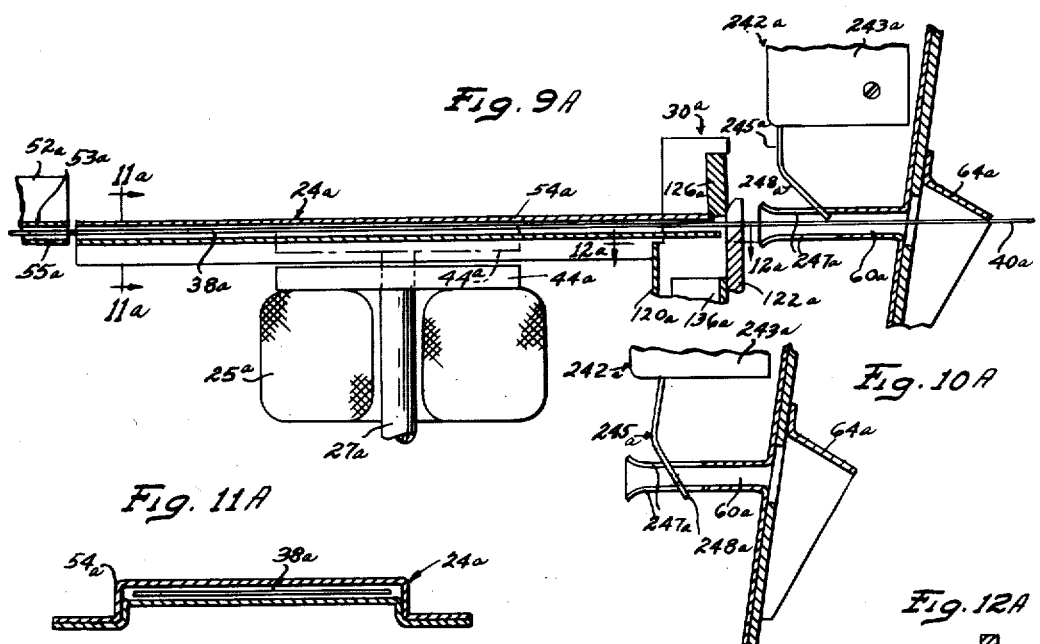
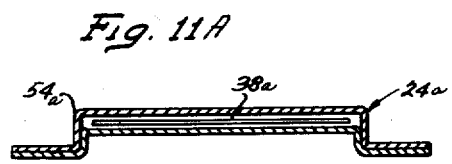
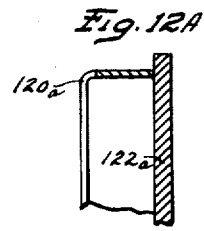
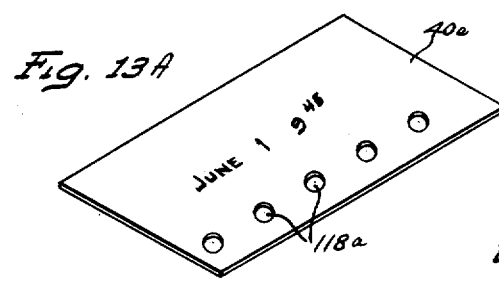
INVENTOR.
Harold L. Miller.
BY
Wallace P. Lamb
ATTORNEY.

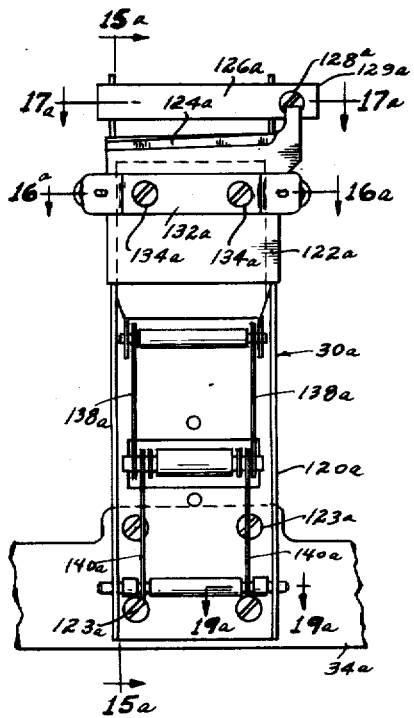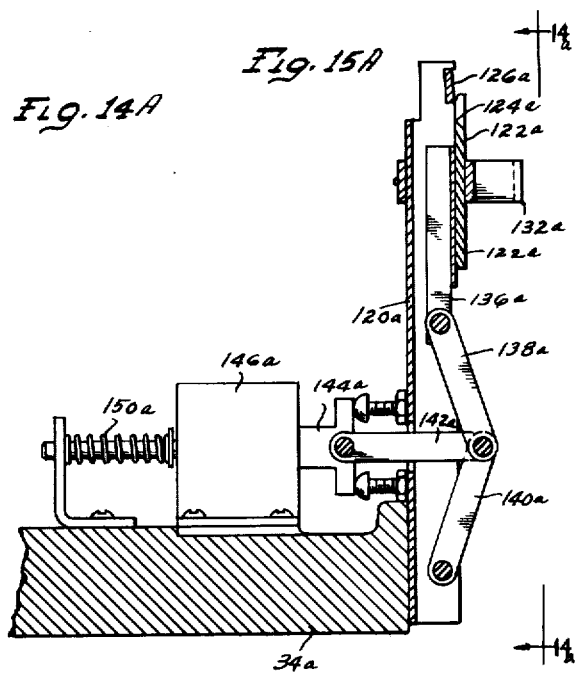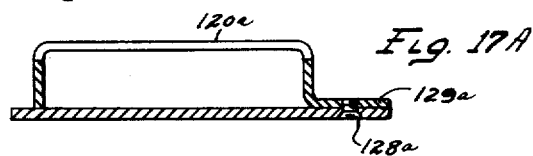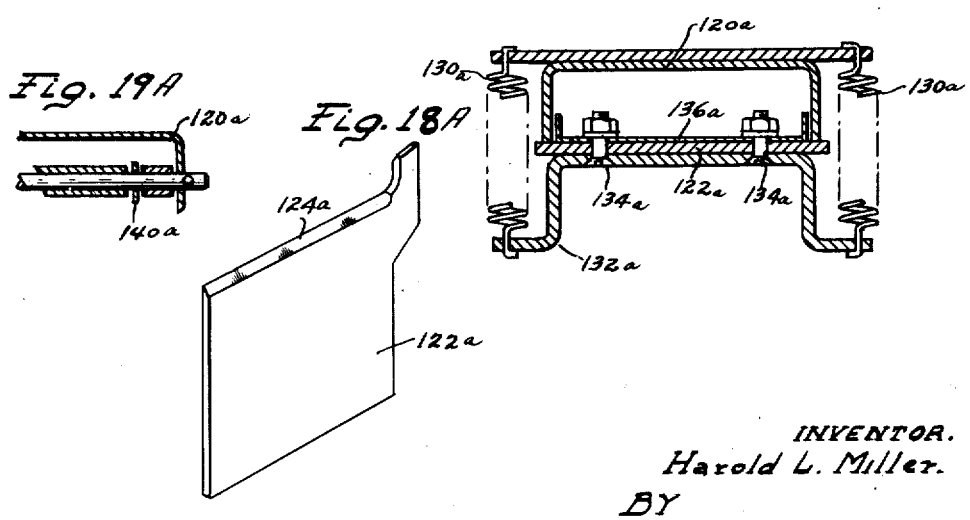

INVENTOR.
Harold L. Miller
BY
ATTORNEY.

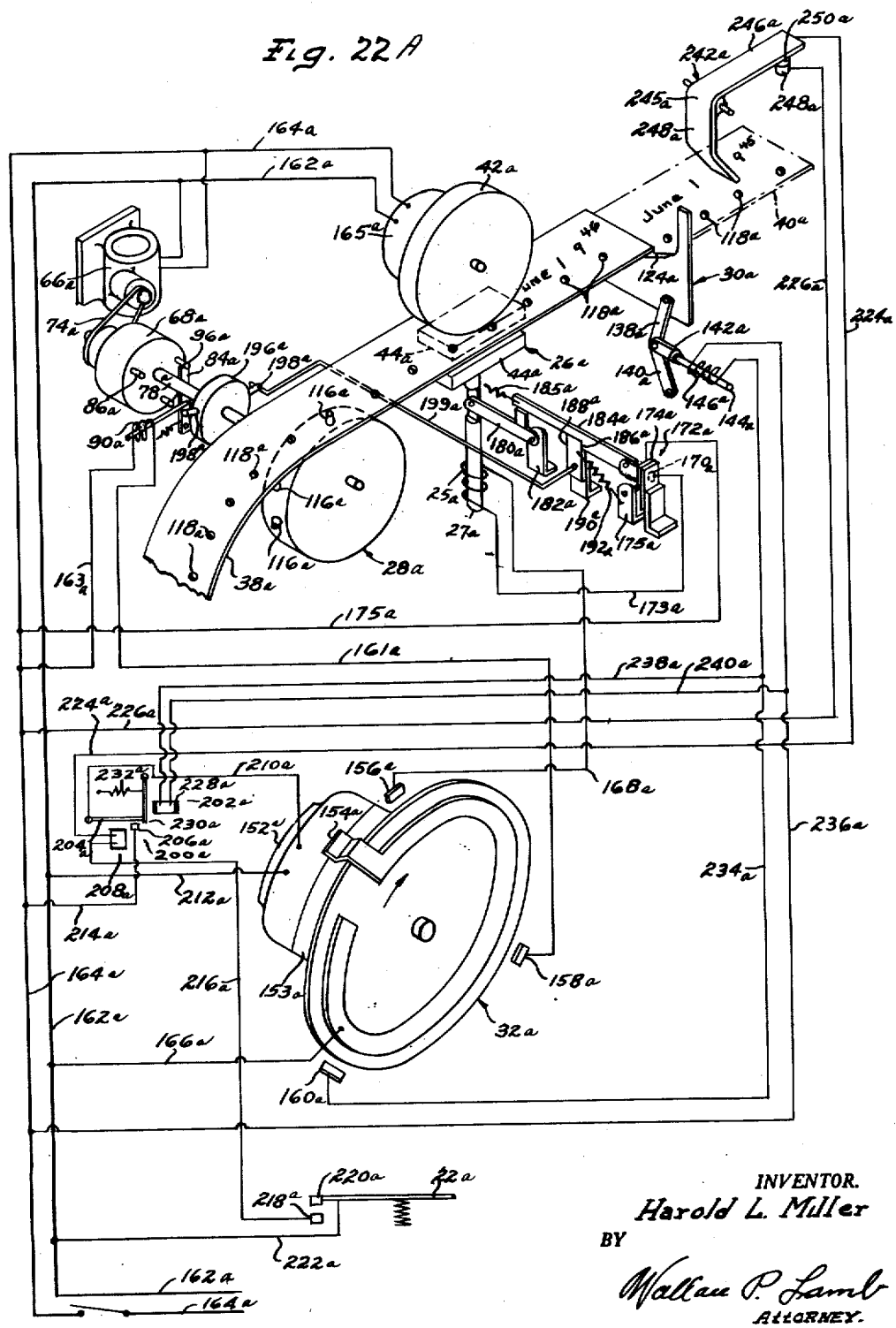

June 18, 1957   H. G. NUTTER ET AL   2,795,875
SYSTEM AND TICKET DISPENSER FOR VEHICLE PARKING LOT
Original Filed May 14, 1953   10 Sheets-Sheet 10

INVENTOR.
Harold L. Miller.
BY
Wallace P. Lamb
ATTORNEY.

United States Patent Office 2,795,875
Patented June 18, 1957

2,795,875

SYSTEM AND TICKET DISPENSER FOR VEHICLE PARKING LOT

Hugh G. Nutter, Grosse Pointe, and Harold L. Miller, Grosse Pointe Park, Mich.

Continuation of applications Serial No. 355,133, May 14, 1953, and Serial No. 451,260, August 20, 1954. This application September 30, 1955, Serial No. 537,846

16 Claims. (Cl. 39—1)

This invention relates generally to vehicle parking lot vending systems and particularly to a parking ticket vending system and ticket dispenser.

The present application is a joint continuation application combining the subject matter of our respective co-pending applications for United States Letters Patent Serial Nos. 355,133, filed by applicant, Hugh G. Nutter, on May 14, 1953, for System for Automobile Parking Areas, and 451,260, filed by applicant, Harold L. Miller, on August 20, 1954, for Vehicle Parking Lot Ticket Dispenser, each of which sole applications is expressly abandoned by the filing of the present joint application.

In the past, as is well known in the operation of parking lots, it has been the practice to have a number of attendants to hand out tickets to customers, park the vehicles, retrieve them, etc. In systems where the parking charge is based on the more equitable plan of charging on the basis of elapsed time of parking, it has been necessary for the attendant to get a time-stamped ticket from a cashier to whom the customer, on leaving, presents the ticket to show thereon the elapsed time whereby to determine the charge for parking. Obviously, the practice of using attendants to handle parking tickets, move cars, etc., is objectionable as it invites confusion, is time consuming, costly in operation, and unsatisfactory to the customer.

Accordingly, the primary object of the invention is to provide an automatic time stamp-ticket dispenser to obviate the above mentioned objections.

An object of the invention is to provide a system and a mechanism for use with an area, such as a parking lot, where automobiles are parked so that a parking lot can be handled by a single operator in the nature of a cashier. To this end, a system is provided for automatically controlling a driveway or passage to the area, and for issuing to the operator a ticket indicating the time. The mechanism is controlled conjointly by the presence of the vehicle in the driveway and by the handling of the ticket by the operator of the vehicle or other person in the vehicle.

Another object of the invention is to provide for parking lots a novel ticket dispenser and novel arrangement of controls therefor to increase the efficiency of parking lot operation.

Another object of the invention is to provide a novel arrangement of time stamp and ticket dispenser mechanisms cooperating to provide each parking customer on entering the parking area with a time stamped ticket automatically presented within reach of the driver.

Another object of the invention is to provide a machine of the above mentioned character in which operation thereof is automatically initiated by an approaching vehicle.

Specifically with respect to the next preceding object, a dispenser controlling ticket operating switch is provided at the dispenser outlet for the dual purpose of controlling the dispenser and serving as a guard to prevent tampering with the mechanism through the ticket discharge.

Another object of the invention is to provide a time stamp-ticket dispenser in which circuit to a platten operating solenoid is broken immediately following the stamping operation so as to prevent repeated stamping action, and to provide for automatically closing the solenoid circuit by the dispensing mechanism following de-energizing of the solenoid whereby to reset the stamp for the next ticket.

Another object of the invention resides in the arrangement and cooperation of the stamping, feeding and severing of the ticket and the cycle control of such functions.

Another object of the invention is to provide a ticket dispenser and controls therefor which prevent accumulation of dispensed tickets in the dispenser outlet.

Another object of the invention is to provide for a parking lot ticket dispenser of the character in which initiation of operation is effected automatically by an approaching vehicle, a control arrangement which permits the dispensing operation providing there is no previously dispensed ticket in the machine.

Another object of the invention is to provide a parking lot ticket dispenser of the above mentioned character together with cooperating controls to insure against a motorist entering the parking area unless he first removes the dispensed ticket from the dispenser.

Other objects of the invention will become apparent from the following detail description taken in connection with the accompanying drawings in which:

Fig. 3 is an enlarged view showing gate operating apparatus;

Fig. 6 is a view similar to Fig. 5 showing a further intermediate condition;

Fig. 1a is a perspective fragmentary view of a modified parking ticket dispenser and an automobile illustrating the utility of the ticket dispenser;

Fig. 2a is an enlarged fragmentary side view of the ticket dispenser;

Fig. 3a is a horizontal sectional view of the dispenser, taken along the line 3a—3a of Fig. 2a;

Fig. 4a is a side view of the dispenser mechanisms with parts broken away and in section;

Fig. 5a is a vertical sectional view of the part of the dispenser, taken along line 5a—5a of Fig. 3a;

Fig. 6a is a detail sectional view, taken along line 6a—6a of Fig. 3a;

Fig. 7a is a vertical sectional view of parts of the dispenser, taken along line 7a—7a of Fig. 3a;

Fig. 8a is a vertical cross sectional view of a detail of the dispenser, taken along line 8a—8a of Fig. 7a;

Fig. 9a is another vertical sectional view of parts of the dispenser arm in open circuit position, taken along line 9a—9a of Fig. 3a;

Fig. 10a is a sectional view showing the ticket operated switch arm of Fig. 9a in the other or normally closed position;

Fig. 11a is a vertical cross sectional view of the machine's ticket strip guideway, taken along line 11a—11a of Fig. 9a;

Fig. 12a is a horizontal sectional view of a detail of a ticket cutter, taken along line 12a—12a of Fig. 9a;

Fig. 13a is an isometric view of one of the dispensed parking tickets;

Fig. 14a is a vertical elevational view of the ticket cutter, taken in the direction of the arrows 14a—14a of Fig. 15a;

Fig. 15a is a vertical sectional view of the cutter taken along line 15a—15a of Fig. 14a;

Fig. 16a is a cross sectional view of the cutter, taken along line 16a—16a of Fig. 14a;

Fig. 17a is a detail sectional view of the cutter mechanism, taken along line 17a—17a of Fig. 14a;

Fig. 18a is an isometric view of the cutter blade;

Fig. 19a is a detail sectional view of the cutter, taken along line 19a—19a of Fig. 14a;

Fig. 22a is a diagrammatic view showing the devices of the time stamp ticket dispenser and electrical circuits therefor;

Figure 1:
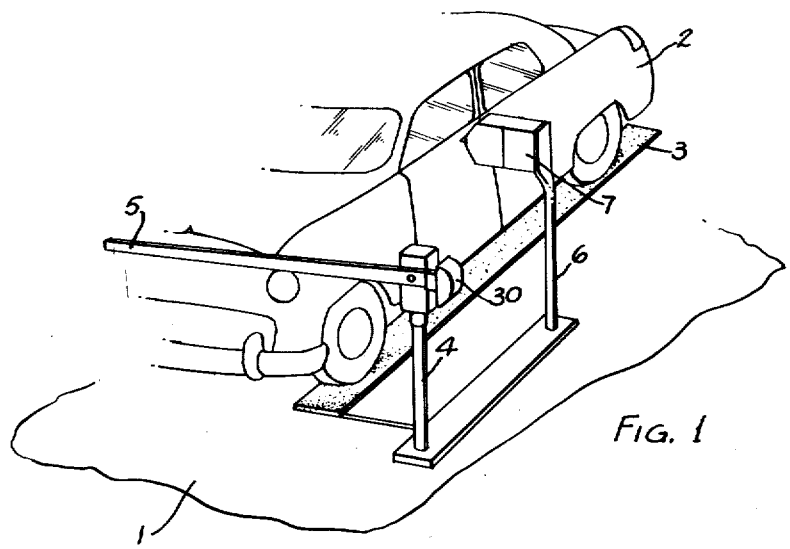
Fig. 1 is a perspective view illustrating a traffic control gate and ticket dispenser arrangement with an automobile in a position for entering the area.
Figure 7:
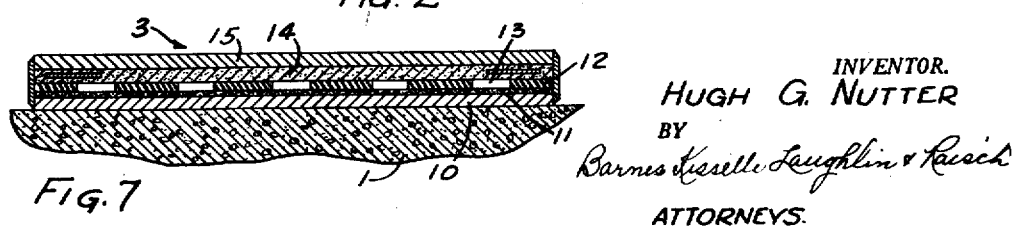
Fig. 7 is a cross sectional view of a mat upon which the car is driven to establish an electrical current for the system.

Referring to the first embodiment of Figs. 1–7, as shown in Fig. 1 the surface of a driveway is illustrated at 1 over which a car 2 is driven into the parking lot or area. There is a mat 3 upon which the wheels of the car are driven, a post 4 having a rocking traffic control arm 5 and a post 6 with a housing 7 for containing ticket dispensing mechanism. The mat, as shown in Fig. 7, may comprise a base member 10 for supporting a metallic screen or similar layer 11, above which is a layer of readily distortable substance, such as rubber 12, having a plurality of apertures 13. Above the layer 12 is a layer of conductive rubber 14 and above the layer 14 is a suitable top or surface member 15. The wheels of the vehicle on the layer 15 depress the same, distort the rubber layer 12 and cause the conductive rubber layer 14 to physically engage the screen 11 to thus make an electrical circuit.

Figure 2:
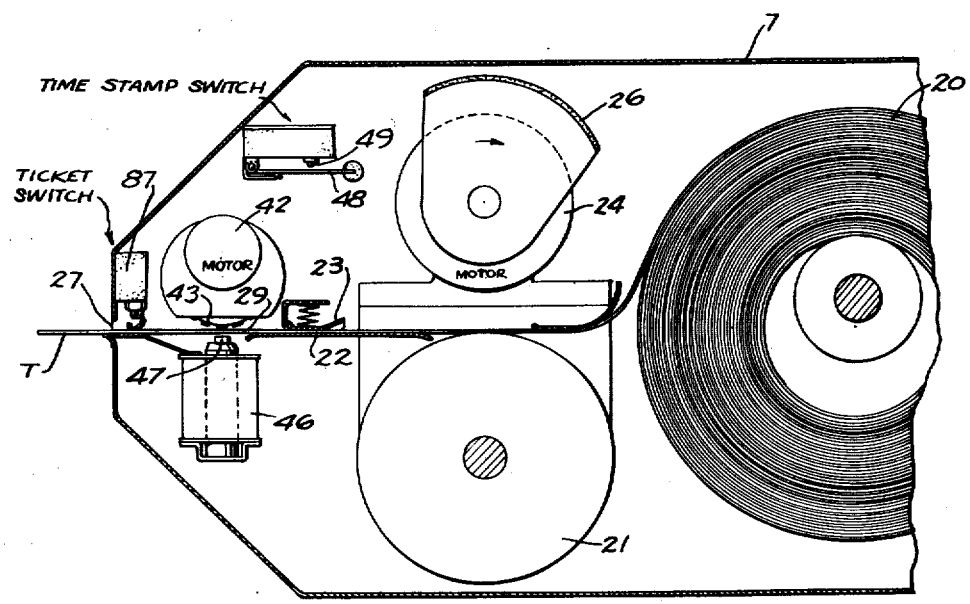
Fig. 2 is an enlarged view particularly in cross section showing apparatus of the ticket dispenser.

As shown in Fig. 2 the housing 7 contains a roll of tickets 20 threaded over a backing roller 21 over a guide 22 and under a spring pressed shoe 23 for offering some resistance to the movement of the strip of tickets. A ticket feeding motor is shown at 24 and it drives a segmented ticket feeder with an arcuate surface 26. As the surface 26 moves clockwise, as Fig. 2 is viewed, the strip of tickets is engaged between the wheel 21 and the member 26 and fed to the left as Fig. 2 is viewed. As shown in Fig. 2 the leading ticket is fed so that it projects through an opening 27. The ticket material may be perforated so that when a leading ticket projects, as shown at T (Fig. 2), it may be grasped and separated from the remaining ticket material at the perforated line 29. Some other mechanisms are in the housing 7 but these will be later considered.

In the housing 30 (Figure 3) on the top of the post 4 is a shaft 31 which carries the arm 5. A motor 32 through the means of a belt 33 operating over pulleys operates a screw shaft 34 upon which is a nut 35 connected by an arm 36 to the shaft 31. The motor and screw shaft 34 are carried by a rocking assembly 37 which rocks to accommodate arcuate travel of the nut 35. Some other elements are shown in Fig. 3 but these will be considered later.

Figure 4:
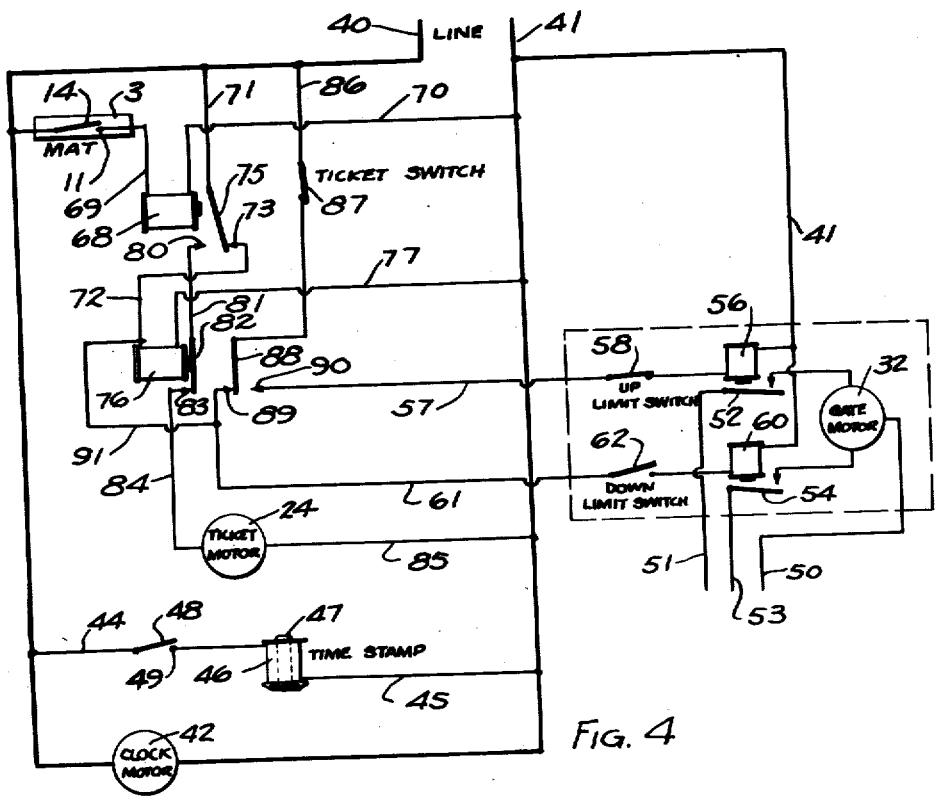
Fig. 4 is a wiring diagram illustrating the normal or starting position of the system.

Referring now to Fig. 4, the mat is indicated at 3 and the contacting portions 11 and 14 in the mat are indicated as a switch. A suitable power line has leads 40 and 41. Connected across the leads 40 and 41 is the motor 42 of a time stamp having time stamp wheels 43 positioned adjacent the ticket material (Fig. 2). Also connected across the lines 40 and 41 by lines 44 and 45 is a coil 46 with an armature 47 and in the circuit is a switch having a contact 49 and a movable arm or contact 48. As shown in Fig. 2 the arm 48 is in position to be engaged by the segment 26. The switch 48—49 is normally open. The armature 47 is located on the opposite side of the ticket material from the time wheels as shown in Fig. 2.

As shown in Fig. 4 the gate driving motor, which is a reversible motor, is again indicated at 42. It has a common line 50, a line 51 with a switch 52 therein and a line 53 with a switch 54 therein. The switch 52 is operated by a solenoid 56 connected into a line 57 and connected to the line 41. And in the line 57 is an up-limit switch 58. The switch 54 is operated by a solenoid 60 connected to the line 41 and to a line 61 in which is located the down-limit switch 62. The limit switches are shown in Fig. 3 and are operable by cams 64 and 65 mounted on the shaft 31 or on the hub of the arm 36. These switches are normally closed but when the gate is down, which is the position shown in Fig. 3, the cam 64 opens the down-limit switch. It will be understood that as soon as the shaft 31 rotates to some extent clockwise that the cam 64 disengages the switch 62 so that it closes and that when the gate arm 5 is up the cam 65 engages the up-limit switch 58 and opens it.

Referring again to Fig. 4 it will be seen that the switch structure of the mat is connected in series with a coil 68 by conductors 69 and 70. A conductor 71 is provided with a switch 75 normally engaged with contact 73 and conductor 72 extends to a coil 76 while a conductor 77 leads back to the line 41. This is a normal condition and, therefore, it will be seen that the coil 76 is normally energized. A contact element 80 for the switch arm 75 has a conductor 81 in which is a switch arm 82 normally in contact with a contact element 83 from which leads a conductor 84 to the ticket motor 24 which is connected back to the line 41 by a conductor 85. A line 86 is provided with a ticket switch 87 which is normally closed as shown and which extends to the relay switch arm 88 normally held in engagement with contact 89 by the normally energized relay coil 76. The line 61 for the down-limit switch connects to contact 89. The line 57 for the up-limit switch has a contact 90 associated with the relay arm 88. A line 91 connects the contact 89 with the conductor 72 and thus constitutes a parallel connection with line 72 for the relay coil 76.

The normal position of the system is as shown in Fig. 4 with the gate down as shown in Figs. 1 and 3. However, the ticket T as shown in Fig. 2 is normally removed. Therefore, the switch 87 is closed as indicated in Fig. 4. In this normal condition, there is no contact through the mat but the relay coil 76 is constantly energized through line 71, switch 75, line 72 and line 77. The relay coil 76 is also energized through the parallel line 86, ticket switch 87, switch 88 of the relay coil 76 and line 91. This is a holding circuit. The circuit for the ticket motor is broken at the contact 80. The circuit for the time stamp coil 46 is broken by the switch 48. The time stamp clock motor runs constantly. The gate is down and the down-limit switch 62 is open as shown in Figs. 3 and 4. Thus the coil 60 is not energized and the motor switch 54 is open. The up-limit switch is closed because the cam 65 is removed from the switch 58 but the coil 56 is not energized because the circuit is broken at the contact 90. Therefore, the motor switch 52 is open.

Figure 5:
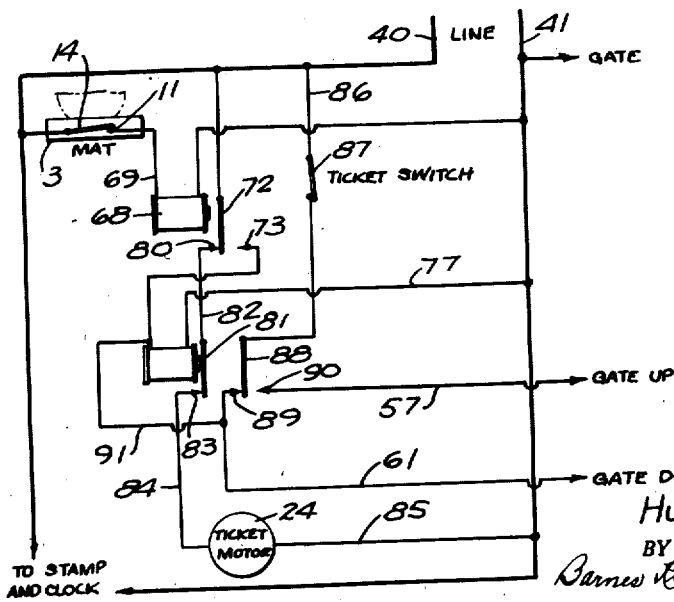
Fig. 5 is a view of some of the wiring system indicating an intermediate condition.

When a car is driven into the position shown in Fig. 1, and on to the mat 3, a circuit is established across 11 and 14 thus energizing relay coil 68 and swinging the arm 75 into contact with 80 (Fig. 5). This breaks one circuit through the relay coil 76 but relay coil 76 remains energized by the holding circuit through the ticket switch circuit 86, 87, 88 and 91. This makes a circuit through 81, 82, 84 for the ticket motor 24 which begins to operate. The ticket motor will turn clockwise, as Fig. 2 is viewed, and the segment 26 will engage the ticket stock which is backed up by the wheel 21 and feed a ticket to the left and to the position shown in Fig. 2. The condition of the circuit is illustrated in Fig. 5 where it will be noted that the circuit to the ticket motor is completed.

As the ticket is projected forwardly, it engages and opens the switch 87 (Fig. 6) and the ticket holds the switch open. This de-energizes the relay coil 76 and the switch arms 82 and 88 shift to the position shown in Fig. 6. This movement of the arm 82 breaks the circuit for the ticket motor. In the meantime, however, the ticket motor coasts to a stop substantially to the position shown in Fig. 2 in which action the segment 26 engages and momentarily closes the switch 48—49 in the time stamp circuit and the armature 47, acting as a hammer, is pulled upwardly and it strikes the ticket forcing it against the time stamp device 42 to mark the time on the projected ticket. The relay arm 88 makes contact at 90 and thus closes the gate motor circuit through the up-limit switch 58 to the solenoid 56 to operate the gate motor. However, this circuit is still open because of the presence of the ticket which holds the switch 87 open. So the operator must now remove the ticket tearing it at the perforated line 29 and when the ticket is removed the ticket switch closes and the coil 56 is energized thus closing the switch 52 to operate the gate motor in a direction for raising the gate arm 5. Upon movement of the gate arm upwardly the cam 64 leaves the down-limit switch 62 and it closes but the circuit is open at the contact 89 (Fig. 6). The gate continues to move upwardly until the cam 65 engages and opens the up-limit switch 58 at which time relay coil 56 is de-energized, the switch 52 opens and the gate motor ceases operation.

At this time, the ticket switch 87 is closed but the relay coil 76 is not energized because the circuits therefor are broken at 88—89 (Fig. 6) and at 75—73.

With the gate thus positioned upwardly the vehicle is driven off the mat and when the weight of the car is removed from the mat, the circuit through the relay coil 68 is broken and the arm 72 moves back into engagement with contact 73 thus energizing relay coil 76. This causes the arms 82 and 88 to move from the Fig. 6 position back to the Fig. 4 position. This closes the holding circuit for the coil 76 through the ticket switch 87 and completes a circuit through the contact 89 and line 61 through the down-limit switch 62 which is now closed to energize the coil 60. This closes the switch 54 and the gate motor operates in the opposite direction. The gate arm 5 moves down to closed position and when it reaches closed position, the cam 64 engages and opens the limit switch 62 and the system is restored to the condition shown in Fig. 4 and ready for another operation.

The diagram in Fig. 5 shows the position of the parts and the condition of the electrical system when a car is on the mat, thus making a circuit for energizing the relay coil 68 and completing a circuit through the ticket motor. The diagram in Fig. 6 indicates the condition when the ticket has been projected and the ticket has opened the switch 87 thus de-energizing the relay coil 76 and establishing a circuit for the upward movement of the gate arm which, however, cannot take place until the circuit is finally closed at the switch 87 by the removal of the ticket.

Thus, in brief, when a vehicle is driven into position on the mat, the ticket is dispensed and stamped with the time thereon. Nothing will happen until the operator removes the ticket at which time the gate arm goes up. When the gate arm is at its upper position its movement will cease but nothing further happens as long as the vehicle stands on the mat. When the vehicle is driven off the mat, the gate arm comes down and the circuit is set for another cycle of operation. Thus the presence of the car causes the issuance of and the stamping of the ticket, the removal of the ticket results in the opening of the gate arm, and movement of the car off the mat results in closing of the gate arm.

In use, the driver of a vehicle may enter a parking area through the gate as above described and receives the dispensed ticket with the time of entry stamped thereon. In fact, the operator must take the ticket in order to open the gate for entry. When the driver returns for his car the ticket is presented to an operator who may then make a charge for the parking fee based on the length of time the vehicle was in the parking area.

It has been convenient to show a "mat" type of device upon which the vehicle rests and which embodies contact means for the controlling circuits. This term is also used in some of the claims. It is to be understood, however, that insofar as this case and claims are concerned, that the term "mat" is to be considered broadly as some sort of a yieldable surface or means in a surface for establishing an electrical contact incident to the weight of the vehicle.

Referring now to the modified embodiment of Figs. 1a–24a in the drawings, Fig. 1a illustrates the utility of the invention by showing time stamp-ticket dispenser 20a located along the entrance driveway of a parking lot to dispense a ticket to the driver of each entering vehicle. The vehicle on approaching the dispenser 20a, passes over and depresses a switch control, or treadle 22a which initiates operation of the time stamp-ticket dispenser 20a. When this occurs, the machine stamps the time on strip ticket paper, then feeds the paper out the discharge and then severs the paper in ticket form. As illustrated, the dispenser 20a is arranged such that the vehicle driver can take the ticket without getting out of the vehicle. On leaving the parking lot, the driver presents the ticket to a cashier who stamps the ticket to record and note the elapsed time of parking to determine the parking charge.

In general, the time stamp-ticket dispenser 20a includes a ticket strip guideway 24a, a time stamp 26a, a ticket feeding means or wheel 28a, a ticket cutter 30a, and a cycle control 32a. These devices, together with associated mechanisms, are mounted on a support or base 34a which is removably mounted on and within an upright housing 36a. The guideway 24a is horizontally disposed, and the feed wheel 28a, time stamp 26a and cutter 30a are arranged along the guideway in the order named from the guideway inlet to the outlet thereof. Normally, the vehicle actuated treadle switch 22a controls the cycle control 32a which when energized functions to first effect time stamping of the ticket strip, then feeding of the strip along guideway 24a a distance equal to the desired length of ticket, and then effect severing of the ticket. The numeral 38a designates the ticket strip, and the numeral 40a designates a severed ticket in the dispenser discharge.

Mounted on the base 34a between the feed wheel 28a and the cutter 30a is the time stamp 26a which is illustrated as comprising, in general, a time print wheel 42a and a platten 44a. The print wheel 42a is operated by a clock mechanism (not shown) and the platten 44a is actuated by a solenoid which as represented in Fig. 22a comprises a coil 25a and a movable armature 27a. The time print wheel 42a is located above the guideway 24a and the platten 44a is located directly therebelow, the guideway being provided with a clearance opening 46a for the platten. Suitable casings 48a and 50a are preferably provided respectively for the print wheel 42a and the platten 44a, and said casings may be suitably secured to the base 34a. The casing 48a also houses the time clock mechanism which operates the print wheel 42a in the well known manner. The time clock is not shown in detail since such devices are well known in the art and since the details of the clock do not constitute any part of the present invention.

As previously mentioned the guideway 24a extends horizontally, and as shown in Figure 4a, is made in sections comprising what may be termed a feed guide section 52a and a time stamp guide section 54a. Guide section 52a is supported above the feed wheel 28a by spaced uprights 56a which are secured to and extend upwardly from the base 34a, whereas guide section 54a is supported on the top of the platten housing 50a. Guide section 52a has an inlet 58a into which the ticket strip 38a is fed by action of feed wheel 28a. In alignment with the guideway is a ticket discharge 60a which is spaced from the ticket cutter 30a and is secured to a housing front panel 62a. Also secured to the panel 62a, but on the outside thereof is a shield 64a which may be provided to protect the discharge against entrance of dust, rain, etc. The guideway section 52a comprises nested channels 53a and 55a (Figure 8a) which have aligning apertures in their side flanges to receive a readily removable pin 57a which has one end bent inwardly over the channel and downwardly, as at 59a, for attaching the channels together in a manner such that the top channel may be readily removed to give access to the interior of the guideway.

Referring now more particularly to the ticket feed mechanism, the principal unit of this mechanism, insofar as the present invention is concerned, is the ticket feed wheel 28a, the other units being an electric driving motor 66a and an overrunning clutch 68a. The motor 66a is connected in circuit so as to operate continuously when connected to a source of electrical energy such as the usual A. C., 115 v. line, and drives one of the components of clutch 68a through speed reduction mechanism including a drive pulley 70a and a driven pulley 72a, connected by a drive belt 74a. Driven pulley 72a is affixed to a shaft 76a, and the other clutch component is operatively connected to a driven shaft 78a to which the feed wheel 28a is affixed. The shaft 78a is journaled in spaced standards 80a which are mounted on base 34a and arranged such that the shaft extends beneath and transversely of the guideway 24a.

The clutch 68a is not shown or described in detail because such devices are well known in the art to which the invention appertains and form no part of the invention. However, in general, the clutch 68a is of the so-called overrunning type having the usual rotating member 82a and trigger 84a therefor to control the clutching function. When the trigger 84a permits the member 82a to rotate, clutching function results and motor 66a rotates the feed wheel 28a through a partial revolution which determines the length of ticket fed. In the present machine it has been found desirable to rotate the feed one-third revolution for each ticket dispensed. To this end, the clutch is adapted by providing the control member 82a with three equally and radially spaced stop pins 86a for successive engagement by the trigger 84a. The trigger 84a is represented as an arm pivoted, as at 88a, at the lower end thereof and arranged so that its upper end will engage one of the pins 86a to render the clutch inactive. A solenoid 90a actuates the trigger 84a in a direction to effect clutching action against a return coil spring 92a (see Fig. 5a). As shown, the solenoid 90a has the usual movable armature 94a and this armature is connected by a pair of links 96a to the trigger 84a adjacent the upper end thereof. In operation, when the solenoid 90a is energized, the trigger 84a is pivoted out of engagement with the contacting pin 86a, permitting the clutch to rotate the feed wheel 28a, but the cycle control 32a functions, as will hereinafter be understood, so that the solenoid 90a is de-energized in time to permit trigger 84a to return and engage the next pin 86a, thus limiting rotation of the feed to one-third revolution.

On the other end of shaft 78a from clutch 68a a stop device is provided, designated generally by numeral 98a to prevent appreciable reverse rotation of the feed wheel 28a. The device 98a comprises a plate 100a having a hub which fits onto shaft 78a and is attached thereto by a set screw 102a to provide a mounting for a stop ring 104a. The ring 104a fits over the plate hub and is attached to the plate by adjustment screws 106a which extend through arcuate clearance slots 107a in the stop ring 104a to screw thread into the plate 100a. On its outer periphery, the stop ring 104a is provided with three equally spaced abutment or stop surfaces 108a corresponding to the three stop pins 86a of the clutch 68a. To engage successively the stop surfaces 108a and thus limit reverse rotation of the feed wheel 28a is a pivoted stop arm 110a which is pivoted at its lower end to a bracket on base 34a. The arm 110a is urged into engagement with the stop surfaces 108a by a tensioned coil spring 113a.

Like the reverse stop device, the feed wheel 28a is adjustably mounted on shaft 78a by attaching the wheel to a flange or adjustment mounting plate 112a which may be secured to the shaft by a set screw or other suitable means. Adjustment screws 114a extend through arcuate clearance slots in the plate 112a and screw thread into the wheel 28a to hold the wheel in adjusted position on the shaft 78a. It will be understood that by means of the above described adjustments both the feed wheel 28a and the reverse stop ring 104a can be individually adjusted so as to be synchronized with each other and with the clutch 68a. On the periphery of the feed wheel 28a are radially spaced pins 116a adapted to engage in marginal perforations 118a in the ticket strip 38a to effect feeding of the strip along the guideway 24a.

At the end of the guideway 24a is the cutter 30a which, after the ticket feeding operation, functions to cut-off the time stamped ticket 40a from the strip 38a. The present cutter 30a (best shown in Figures 14a and 15a) comprises a support 120a in the form of an upright channel which is secured at its lower end to the base 34a by means of screws 123a. Slidably guided on the edges of the channel support 120a is a vertically movable cutter blade 122a. The blade has an upwardly directed cutting edge 124a adapted to cooperate with the lower edge of a fixed upper blade 126a to sever the tickets from the strip 38a, the cutting edge 124a being inclined to give a shearing action. The blade 126a is retained in slots provided in the rear edges of the channel support 120a and is secured in place by a screw 128a which extends through the blade and screw threads into an outturned ear 129a of one of the channel sides. A pair of coil springs 130a urge the blade 122a against the edges of the channel support 120a, the springs being under tension between the channel support 120a and the outturned ends of a bracket 132a which is secured by nuts and bolts 134a to the support and to a blade carrier 136a. The carrier 136a is channel shape and at its lower end is pivoted at the sides thereof respectively to upper links 138a of a toggle for vertically moving the blade 122a. The lower toggle links, as at 140a, are pivoted to the channel support 120a and the adjacent ends of the toggle links 138a, 140a are pivoted together and to one end of a toggle operating link 142a. The other end of link 142a is pivotally connected to a movable armature 144a of a solenoid 146a. It will be seen that when the solenoid 146a is energized, the toggle is actuated and the blade 122a is moved upwardly to shear a ticket against the edge of fixed blade 126a. A return spring 150a acts to return the toggle and blade 122a to the positions shown.

Shown diagrammatically in Fig. 22a is the cycle control 32a which is adapted to energize and de-energize successively the time stamp solenoid 25a, the ticket feed solenoid 90a and the cutter solenoid 146a in the order named. The control 32a comprises in general an electric motor 152a, a casing 153a containing a timer mechanism (not shown), and a rotary switch contact 154a. Motor 152a rotates the contact 154a, regulated by the timer mechanism, and preferably a synchronous motor is used. Any of the well known cycle controls may be employed. Rotary contact 154a is arranged to make and break contact successively with fixed radially spaced contacts 156a, 158a and 160a. The feed control solenoid 90a is connected to the cycle control contact 158a by a lead 161a, and to one of the main leads by a lead 163a. The numerals 162a and 164a designate main leads which connect to the clock motor 165a and feed motor 66a, and to main lead 162a is connected the rotary contact 154a, by a lead wire 166a. Fixed contact 156a is connected by a lead wire 168a to one end of the time stamp solenoil coil 25a which has its other end connected to a fixed contact 170a of a switch 172a by means of a lead wire 173a. Switch 172a has an arm 174a, pivoted on a bracket 175a and the arm carries a contact 176a (see Figs. 20a and 21a) cooperable with the fixed contact 170a to control the time stamp solenoid 25a. The movable contact 176a is connected by a lead wire 178a to main lead 164a. The switch 172a is provided to break the circuit of the time stamp solenoid instantly following the stamping operation to avoid chattering of the solenoid induced by alternating current.

The switch 172a is opened by mechanism actuated by and upon energization of the solenoid 25a, and said mechanism includes a lever 180a which is pivoted at one end thereof to a bracket 182a on base 34a, and at the other end to the solenoid armature 27a. Above and extending generally lengthwise of lever 180a is a link 184a which has one end pivotally connected to the upper end of switch arm 174a and the other end attached to a tension spring 185a which acts to move link 184a lengthwise and separate the contacts of switch 172a. Intermediate the ends of link 184a, an offset of the lower edge thereof provides a vertical catch 186a for abutment by a pivoted latch 188a. Latch 188a is pivoted near its lower end on a bracket 190a and is held against catch 186a by a coil spring 192a which exerts a greater force than spring 185a. However, when solenoid 25a is energized, the armature 27a moves upwardly pivoting lever 180a which has an upwardly directed extension 194a that engages and moves the link 184a upwardly sufficiently to unlatch the link from the latch 186a. When this occurs, spring 185a becomes effective to move the link 184a lengthwise in a direction to disengage contact 176a from fixed contact 170a, thus breaking the circuit to and de-energizing the solenoid 25a to prevent chattering thereof. The armature 27a and lever 180a return to de-energized positions, but the spring 185a continues to hold contact 174a open, as shown for example in Fig. 20a requiring that the link 184a be reset with the latch 188a in order that contacts 176a, 170a will be closed for the next operation of the time stamp. To this end, it is a feature of the invention to reset or latch closed the contacts 176a, 170a automatically by the strip feed mechanism in synchronization therewith. To accomplish this, a wheel 196a is affixed to the shaft 78a between the feed wheel 28a and clutch 68a, and provide three equally spaced pins 198a to actuate a crank 199a to pivot latch 188a in position to engage the catch 186a of link 184a. When the latch 188a is pivoted counter-clockwise, as seen facing Fig. 20a, spring 185a will move the link 184a downward until the latch 188a engages behind catch 186a after which the stronger spring 192a will act to move the link to the right and close contacts 176a, 170a. Thus following each time stamping of a ticket, the ticket strip is advanced by feed wheel 28a and this rotates a pin 198a to move crank 199a to reset the contacts 176a, 170a for the next time stamping operation.

As previously mentioned, the cycle control motor 152a is normally energized to rotate the switch contact 154a when a vehicle depresses the treadle switch 22a and it will be apparent that a holding circuit is necessary for motor 152a to avoid breaking circuit thereto when the vehicle passes over and releases treadle switch 22a. Any suitable arrangement for providing a holding circuit may be employed such as the pair of relays 200a, 202a commonly referred to as latching and unlatching relays respectively. Relay 200a has the usual movable contact 204a, fixed contact 206a and relay coil 208a. A lead wire 210a connects relay contact 204a to one terminal of motor 152a which has the other terminal thereof connected by a lead wire 212a to main lead 162a, and the relay fixed contact 206a is connected to the other main lead 164a by a lead wire 214a. The relay coil 208a has one end thereof connected by a lead wire 216a to one contact 218a of treadle switch 22a which has a movable contact 220a connected by lead wire 222a to the main lead 162a. The other end of relay coil 208a is connected by lead wires 224a, 226a to the main lead wire 164a, thus connecting treadle switch 22a and latch relay coil 208a in series across lines 162a, 164a. The unlatching relay 202a comprises the usual coil 228a and a movable or pivoted armature 230a which functions as a latch and is biased to latching position by a spring 232a. When relay coil 228a is energized and moves contact 204a to engage contact 206a, the arrangement is such that spring 232a can move latch 230a to a position holding contacts 204a, 206a closed although treadle switch 22a is released. The cutter relay 146a is connected by lead wires 234a, 236a respectively to cycle control contact 160a and main lead 164a, and the latching relay coil 228a is connected across lead 234a, 236a in parallel with cutter relay coil 146a by lead wires 238a, 240a. Thus, when rotary switch 154a engages contact 160a, the cutter solenoid 146a is energized and latch relay 228a is energized, the latter breaking the holding circuit of cycle control motor 152a.

In accordance with another feature of the invention, a ticket actuated switch 242a is provided which is adapted and arranged to prevent function of the cycle control 32a by the treadle switch 22a unless the previously dispensed ticket has been removed from the dispenser outlet. Thus, the control by switch 242a insures that only one ticket is presented at a time by the machine or dispenser irrespective of operation of treadle switch 22a. Switch 242a is contained in a casing 243a (see Figs. 4a, 9a and 10a) which may be suitably mounted on the front panel of the dispenser housing near and directly above the ticket discharge slot 60a. Extending externally of the switch casing 243a is a switch operating member 245a which extends down into the discharge slot to rest on the ticket. The discharge slot is formed in part by top and bottom wall in which elongated clearance apertures 247a are provided to receive the switch operating arm 245a. In Fig. 22a, the switch 242a is diagrammatically represented as comprising the switch member 244a as pivoted and having a contact carrying arm 246a and a depending operating arm 248a, the lower end of which is adapted to rest on a dispensed ticket 40a. A contact 250a carried by arm 246a normally engages a contact 248a and these contacts are in lead wires 224a, 226a and therefore in series with relay coil 208a and treadle switch 22a where closing of the treadle switch will not energize the cycle control motor 152a unless contacts 248a and 250a are closed, and as previously mentioned, contacts 248a and 250a are not closed if there is a ticket in the discharge slot since the ticket will hold the switch open.

*Operation.*—In general, the parking ticket dispenser and associated devices operates as follows: When a vehicle approaching the dispenser 20a depresses the treadle switch 22a, the cycle control motor 152a is energized and rotates the switch contact 154a in the direction indicated by the arrow, engaging successively contacts 156a, 158a and 160a in the order named and coming to rest in the starting position for the next cycle of making and breaking said contacts. When the rotary contact 154a engages fixed contact 156a the time stamp 26a functions to stamp the time on the ticket strip 38a and then the contact 158a is engaged to effect feeding of the strip 38a along the guideway 24a after which contact 160a is engaged to operate cutter 30a to sever a ticket 40a from the strip, the ticket having been advanced to the outlet slot 60a in reach of the driver of the vehicle. As the ticket strip 38a is fed out into the discharge slot, the strip pivots switch 245a in a direction counter-clockwise, as viewed in Fig. 10a to the position shown in Fig. 9a in which position contacts 248a and 250a are parted to prevent the dispensing of additional tickets until the ticket in the discharge slot has been removed. When the ticket is removed, the switch operting member 245a swings about in a clockwise direction, facing Fig. 10a, to the position shown which is the same position in Fig. 22a showing the contacts 248a and 250a in engagement so that the next vehicle will, on depressing treadle switch 22a, initiate operation of the dispenser.

*Detail operation.*—When a vehicle approaching the dispenser 20a depresses the treadle switch 22a, contacts 218a, 220a are closed and if contacts 248a, 250a of the ticket ticket actuated switch 242a are closed, the following circuit is completed to energize relay coil 208a; from main lead 162a, lead 222a, treadle contacts 218a, 220a, lead 216a, coil 208a, lead 224a, contacts 250a, 248a and lead 226a to the other main lead 164a. The energized relay coil 208a attracts armature 204a to contact 206a allowing spring 232a to move latch into position to hold armature 204a closed to provide a holding circuit. When armature 204a engages contact 206a the following circuit is completed to the cycle control motor 152a; from main lead 164a through relay contacts 206a, 204a, lead 210a, motor 152a and lead 212a to the other main lead 162a. Upon energization of the cycle control motor 152a, the timer driven rotary contact first engages fixed contact 156a and completes the following circuit of the time stamp 26a: from main lead 162a through lead 166a, rotary contact 154a and contact 156a, lead 168a, time stamp solenoid coil 25a, lead 173a, switch contacts 170a, 176a and lead 175a to the other main lead 164a. Upon energization of the time stamp solenoid coil 25a, the platten 44a is thrust upwardly to press the ticket strip against the print wheel 42a thus to print the time on the ticket strip.

Figure 20A:
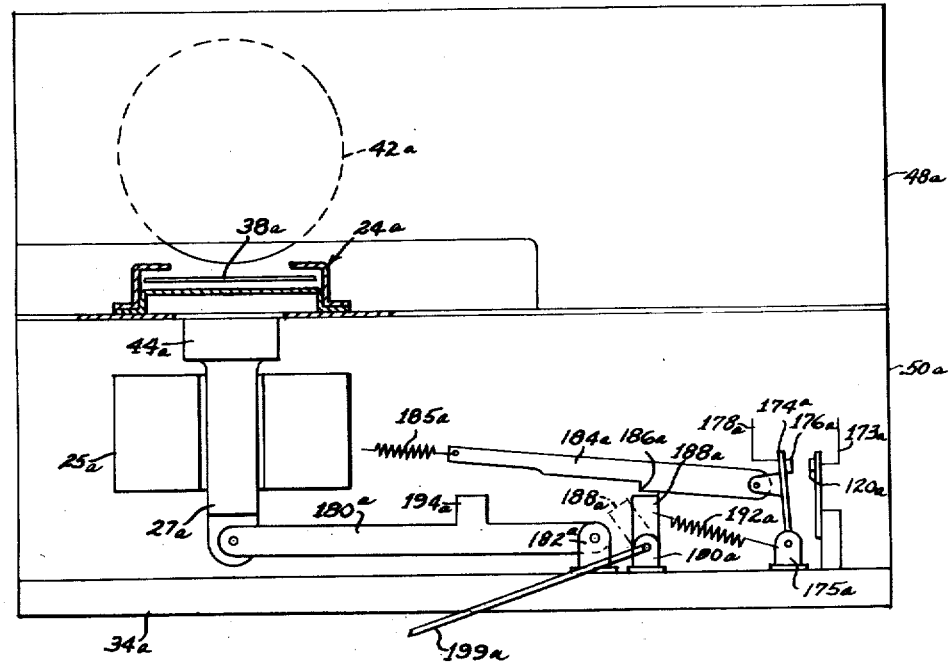
Fig. 20a is a side elevation of a time clock stamp reset device of the ticket dispenser showing operating parts of said device in positions they assume following stamping operation.
Figure 21A:
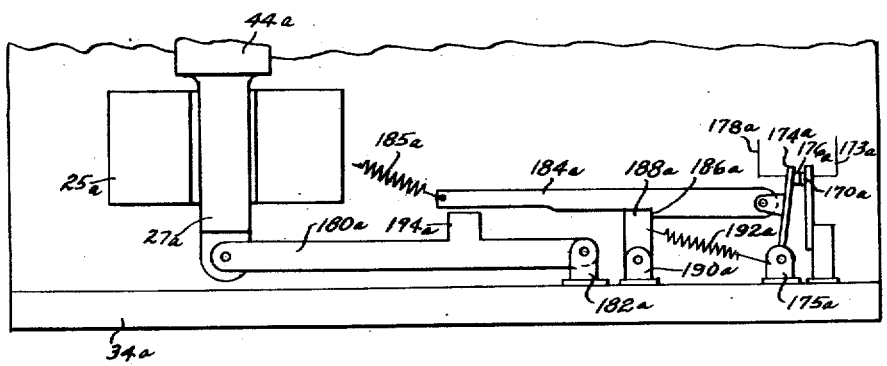
Fig. 21a is a view similar to Fig. 20a showing the operating parts of the device in reset positions.

When the platten 44a is thrust upwardly this movement also pivots lever 180a which in turn moves link 184a upwardly sufficient such that the catch 186a thereon clears the pivoted latch 188a whereby spring 185a is free to move the link 184a in a direction to separate contacts 170a, 176a (see Figs. 20a and 21a). Breaking of these contacts opens the circuit of the time stamp solenoid coil 25a to prevent the fluctuating alternating current causing chatter and repeated stamping of the ticket strip.

The rotary contact next engages fixed contact 158a and closes the following circuit of the strip feed mechanism controlling solenoid 90a: from main lead 162a through lead 166a, control contacts 154a, 158a, lead 161a, solenoid coil 90a, and lead 163a to the other main lead 164a. Thus, when rotary switch 154a engages contact 158a, solenoid coil 90a is energized pushing control arm 84a out of engagement with the abutting pin 86a whereby clutching action is effected by the overrunning clutch 68a to rotate shaft 78a one-third revolution, consequently the feed wheel 28a is rotated accordingly engaging its peripheral pins 116a into the ticket strip holes and advancing the strip along guideway 24a a selected distance equal to the desired length of ticket. The circuit is broken at contacts 154a, 158a in time to allow return of the spring biased control arm 84a to engage the next successive pin 86a and disengage the clutch.

When the ticket feed wheel 28a is rotated, wheel 196a is rotated therewith and one of the pins 198a thereon moves crank 199a in a direction to pivot latch 188a in a counter-clockwise direction, facing Figs. 20a and 21a, until latch 188a positions behind catch 186a after which spring 192a draws the link to the right, closing contacts 176a, 170a. This resets the contacts 176a, 170a so that the next entering vehicle on depressing the treadle switch 22a will close the circuit of relay 208a and initiate a cycle of operation of the time stamp-ticket dispenser.

Next, the rotary switch contact 154a engages fixed contact 160a and completes the following circuit to the ticket cutter solenoid coil 146a: from main lead 162a through lead 166a, control contacts 154a, 160a, lead 234a, cutter solenoid coil 146a, and lead 236a to the other main lead 164a. When this occurs, the cutter blade 122a is thrust upwardly by actuation of the toggle and severs the ticket strip to ticket length after which the solenoid 146a is deenergized when contacts 154a and 160a are broken returning the cutter blade 122a to its inactive position. It will be understood that although the severed ticket drops down slightly onto the bottom of the ticket discharge slot that such movement does not cause switch contacts 248a, 250a to be parted since the arrangement is such that to be parted the ticket must be removed allowing the switch arm to swing down through clearance apertures 247a, as shown in Fig. 10a.

When the circuit of the cutter solenoid coil 146a is energized, latch relay coil 228a is also energized, since the coil is connected by leads 238a, 240a across the leads 234a, 236a of coil 146a. Thus when the cutter is actuated, the latch 230a is moved such that circuit to motor 152a is broken at contacts 204a, 206a to stop operation of rotary contact 154a at its starting position.

Figure 23A:
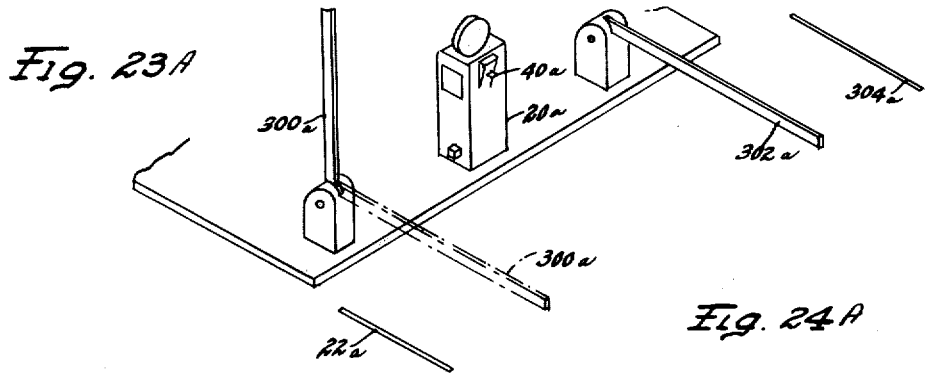
Fig. 23a is an isometric view of a parking lot entranceway including the ticket dispenser and entrance barriers controlled thereby.
Figure 24A:
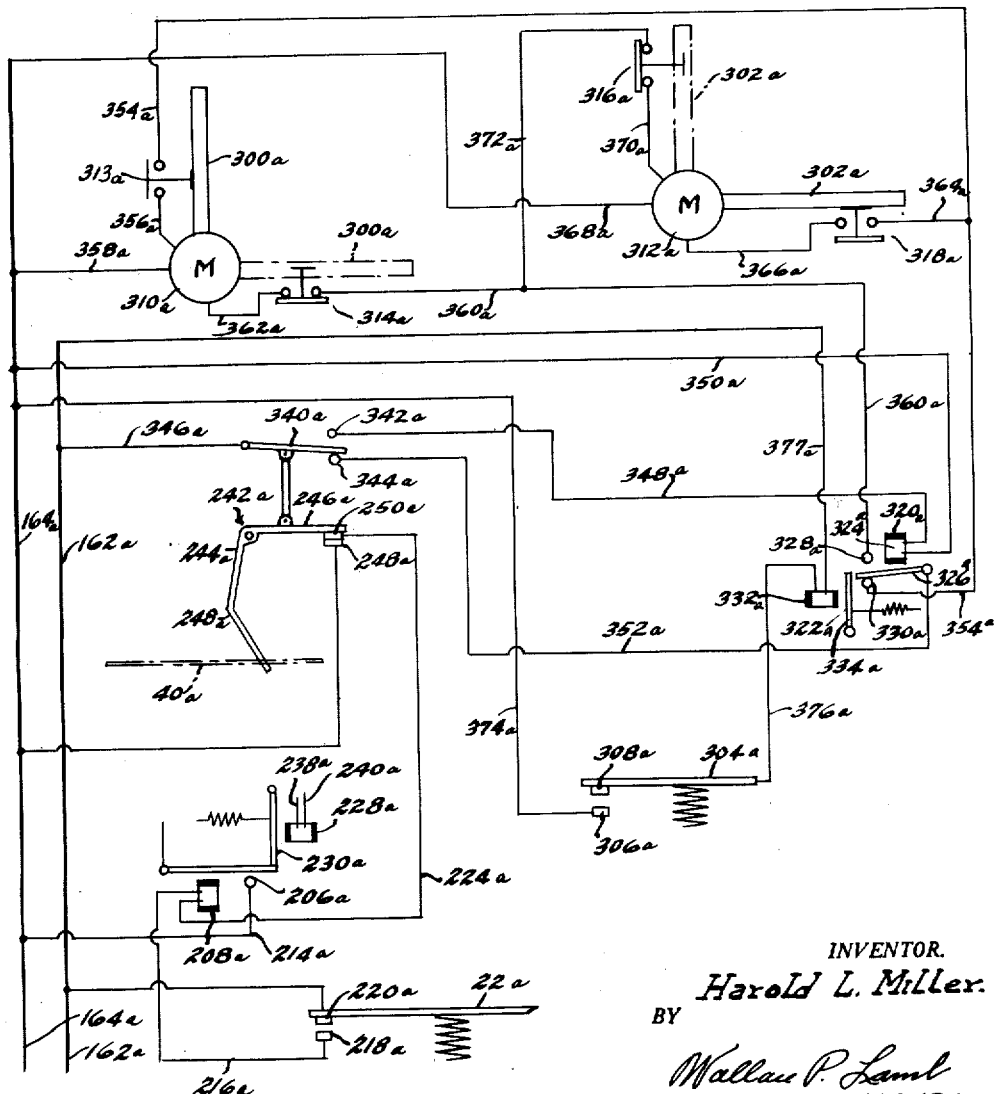
Fig. 24a is another diagrammatical illustration of certain of the devices shown in Fig. 22a together with circuits and controls for parking lot entrance barriers.

In Figs. 23a and 24a, is shown in connection with previously described apparatus, a first barrier or entrance gate 300a and a second barrier or entrance gate 302a which are arranged with the dispenser 20a therebetween such that the vehicle will be between the gates when the driver takes his ticket, to insure that drivers do not pass into the parking area without taking their ticket. Gate 300a is normally open and gate 302a is normally closed as illustrated. Preferably two gates are used so as to prevent more than one car passing through on a single ticket, but the gist of the idea is to have the gates operate under control of the dispensed ticket, i. e., to have the gates operate to permit admission to the parking area only if and when the driver removes the ticket from the dispenser 20a thereby assuring that each customer receives a ticket.

With particular reference to Fig. 24a, this diagrammatical illustration includes certain of the devices of Fig. 22a such as the ticket actuated switch 242a, the circuit holding relay 208a and latch relay 228a, and the treadle switch 22a and so these devices along with details thereof and leads have been given the same reference characters as like elements of Fig. 22a to avoid repetitious description. The numeral 304a designates a second treadle switch which is vehicle actuated and arranged posterior to the second gate 302a to effect return of the gates to the normal positions shown in full lines. Like the first treadle switch 22a, the treadle switch 304a is represented as having a fixed contact 306a, and a movable contact 308a biased to open position.

The gates 300a and 302a are operated respectively by reversible electric motors 310a and 313a. The motor 310a is controlled by a limit switch 312a which limits gate opening movement and by a limit switch 314 which limits gate closing. Similarly, the motor 312a is provided with motor controlling gate limit switches 316a and 318a. Such limit switches are well known in the art and as indicated are biased to closed position and are actuated by the gates, as the gates approach the desired limits.

A holding circuit relay 320a and a latch relay 322a are provided to effect a holding circuit under control of both the ticket actuated switch 242a and the second treadle switch 304a. Relay 320a comprises diagrammatically, a coil 324a, an armature contact 326a, and a pair of fixed contacts 328a and 330a. The latch relay 322a comprises a coil 332a and a pivoted latch member 334a which is biased by a spring 336a that acts to move latch 334a to a position for holding armature 326a against contact 328a providing that the armature coil 324a is energized. Energization of coil 324a is under control of the ticket actuated switch 242a to close the first entrance gate, and control of the latch relay 322a is under control of the treadle switch 304a.

The ticket actuated switch has pivoted thereto a second movable contact 340a which in one position is adapted to engage a fixed contact 342a and in another to engage a second fixed contact 344a. A lead wire 346a connects movable contact 340a to main lead 162a and a lead 348a connects fixed contact 342a to one end of relay coil 324a which has its other connected by a lead 350a to the other main lead 164a thus providing for energization of relay coil 324a when contacts 340a and 342a engage.

The other contact 344a of ticket actuated switch 340a is connected by a lead 352a to relay armature 326a, and the normally closed contact 330a is connected by a lead 354a to one of the fixed contacts of limit switch 312a which has its other fixed contact connected by a lead 356a to the motor 310a. A lead 358a connects motor 310a to the main lead 164a. The normally open contact 328a of relay 328a is connected by a lead 360a to one of the fixed contacts of limit switch 314a which has its other fixed contact connected by lead 362a to the motor 310a. Also connected to the normally closed relay contact 330a is one of the fixed limit switch contacts, connected by a lead 364a to lead 356a, and the other of the fixed contacts is connected to motor 312a by a lead 366a. The motor 312a has a lead 368a connected to main lead 164a and another lead 370a connected to one of the fixed contacts of limit switch 316a which has its other fixed contact connected to the lead 360a by a lead 372a.

Treadle switch 304a has its fixed contact 306a connected by a lead 374a to main lead 164a and its movable contact 308a connected by a lead 376a to one end of the latch relay coil 332a which has its other end connected by lead 377a to the other main lead 162a, thus providing for energization of latch coil 332a and unlatching of armature 326a when the treadle switch 304a is depressed.

*General operation.*—The switches and gates are shown in Fig. 24a as being in normal positions and by normal positions is meant the positions they assume when there is no ticket in the dispenser discharge slot. When a vehicle approaching the dispenser 20a depresses treadle switch 22a, initiation of operation of the dispenser is effected, as before described and a ticket is dispensed. On dispensing operation, the actuator switch 340a is moved by the dispensed ticket against contact 342a which affects the gate motor circuits such that when the driver takes the dispensed ticket, the switch 340a returns to the normal position shown causing the first gate 300a to close and the second gate 302a to open simultaneously, thus allowing the driver to proceed to a parking space. When the vehicle depresses the second treadle switch 304a, the gates 300a and 302a are caused to return simultaneously to the normal positions shown in full lines in Fig. 1a.

*Detail description.*—When switch 340a is actuated by reason of a dispensed ticket pivoting the switch counterclockwise as viewed in Fig. 24a, switch arm 340 is moved to engage contact 342a to complete the following circuit of relay 320a: from main lead 162a, through lead 346a, switch 340a, contact 342a, lead 348a, relay coil 324a, and lead 350a to the other main lead 164a. Upon energization of relay coil 320a, armature 326a engages contact 328a and this allows the biased latch 334a to move into position to hold the armature 326a in engagement with contact 328a irrespective of the ticket actuated switch 340a. Closing of contacts 326a, 328a completes the following circuit of the first gate operating motor 310a providing that the driver of the vehicle at the dispenser removes the dispensed ticket allowing contacts 340a and 344a to engage: from main lead 162a, through lead 346a, switch 340a, contact 344a, lead 352a, armature 326a, contact 328a, lead 360a, limit switch 314a, lead 362a, motor 310a and lead 358a to the other main lead 164a. Motor 310a now operates to close gate 300a which allows limit switch 312a to close and at fully closed position opens limit switch 314a which cuts-out the motor 310a. Also closing of armature 326a and contact 328a also energizes the second gate motor 312a closing the following circuit thereof: from main lead 162a, through lead 346a, switch 340a, contact 344a, lead 352a, armature 326a, contact 328a, lead 360a, lead 372a, closed limit switch 316a, lead 370a, motor 312a, and lead 388a to the other main lead 164a. Thus it will be seen that both gates 300a and 302a are simultaneously operated upon removal of the dispensed ticket, the first gate 300a closing behind the vehicle and the second gate opening to permit the vehicle operator to proceed to a parking space. The vehicle then depresses treadle switch 304a which completes the following circuit to the latch relay 332a: from the main line 164a, through lead 374a, treadle contacts 306a, 308a, lead 376a, relay 332a, and lead 377a to the other main lead 162a. When this occurs, latch 334a is moved out of engagement with armature 326a allowing the armature to break with contact 328a and return to the starting position shown in contact with contact 330a. This resets the switch for the next vehicle, returning the gates to their normal positions.

From the foregoing description it will now be understood that we have provided for parking lots a system and machine thereof which greatly enhances the efficiency of parking lot operation. In this respect, it will be apparent that with the time stamp-ticket dispenser that car moving attendants are not required; that the customer need only present his ticket to a cashier for payment; and that to a certain extent the dispenser serves a bookkeeping function. With further reference to the time stamp-ticket dispenser some of its outstanding features are, the arrangement whereby chattering of the time stamp platten is prevented and the circuit thereof reset automatically and synchronously by the ticket feed mechanism; the synchronous feeding of the ticket strip along the guideway to a discharge slot; the control of the ticket of the cycle control to prevent arbitrary dispensing of ticket by pressing the entrance treadle switch; and the control by the dispensed ticket of the gates so as to insure that each entering customer takes his ticket from the dispenser before being able to enter the parking area.

While we have shown and described two embodiments of the invention in considerable detail, it is to be understood that the invention is limited only by the scope and spirit of the appended claims.

We claim:

1. A parking lot ticket dispenser comprising a casing having a ticket outlet, a ticket feed wheel in said casing operable to feed a ticket strip, a guideway between said feed wheel and outlet along which the ticket strip is fed to the outlet, a time stamp platten and print wheel adjacent said guideway between said ticket feed wheel and the outlet operable to stamp a ticket disposed along said guideway, a ticket cutter disposed posterior to said time stamp platten and print wheel operable to sever a ticket from the strip end, and a cycle switch controlling operation of said time stamp platten, feed wheel, and cutter in the order named.

2. An automobile parking facility system comprising electrically operable time stamp and ticket issuing means located at the entrance of a parking facility for access by the driver of an entering automobile, said means including a casing having a ticket outlet, a rotary feed wheel operable to feed a ticket strip along a path of travel to said outlet, a time stamp mechanism in said casing arranged and operable to stamp the time on the ticket strip, a solenoid operating the stamp mechanism, means responsive to an entering automobile controlling energization of said solenoid, a normally closed switch opened by and upon energization of said solenoid controlling the circuit thereof to prevent repeated stamping action when using alternating current, and an actuator rotatable with said feed wheel operable to return said switch to normally closed position following stamping of the ticket strip.

3. An automobile parking facility system comprising electrically operable time stamp and ticket issuing means located at the entrance of a parking facility for access by the driver of an entering automobile, said means including a casing having a ticket outlet, feed means in said casing operable to feed a ticket strip along a path of travel to said outlet, means controlling said feed means responsive to an automobile moving into said entrance operable to initiate and terminate feeding of the ticket strip to advance the ticket strip a predetermined distance along the path of travel toward said outlet, a time stamp mechanism arranged along said path of travel and operable to stamp the ticket strip, a solenoid in said casing operable to actuate said time stamp, a switch operable to energize said solenoid, a second and normally closed switch controlling said solenoid, said second switch being arranged to be opened by and upon energization of said solenoid to prevent repeated time stamp operation induced when using alternating current, means operable to close said second switch following stamping of the ticket strip, and means synchronized with and actuated by said feed means operable to actuate said last-named means.

4. An automobile parking facility system comprising electrically operable time stamp and ticket issuing means located at the entrance of a parking facility for access by the driver of an entering automobile, said means including a casing having a ticket outlet, a quantity of strip ticket material in said casing, means responsive to an auto moving into said entrance operable to feed said material along a path of travel, a guideway in said casing leading to said outlet receiving said material, a cutter mechanism at the outlet end of said guideway operable to cut off said material to a desired ticket length, and a switch controlling both said feed means and said cutter mechanism actuated by said material, said switch being on the other side of said cutter mechanism from the outlet end of said guideway.

5. An automobile parking facility system comprising electrically operable time stamp and ticket issuing means located at the entrance of a parking facility for access by the driver of an entering automobile, said means including a casing having a ticket outlet, a strip of ticket material in said casing, electric motor means in said casing operable to feed the material along a path of travel toward said outlet, a support for the material along said path of travel having a wall provided with a clearance opening, a control circuit for said motor means and including switch means actuated by said material controlling said feed means having an operating arm normally resting on the material on said support and operable to pass through said clearance opening on removal of said material to actuate said control.

6. An automobile parking facility system comprising electrically operable time stamp and ticket issuing means located at the entrance of a parking facility for access by the driver of an entering automobile, said means including a casing having a ticket outlet, a strip of ticket material in said casing, a horizontal guideway receiving said ticket material, an electrically operated feed device in said casing operable upon actuation to feed the ticket material along said guideway, said guideway having an outlet at one end thereof, said ticket outlet receiving the ticket material from the outlet of the guideway and having a bottom wall, a cutter adjacent said guideway outlet operable to cut off the ticket material to ticket length, a switch controlling said feed means having a switch operating arm resting on and normally supported in open circuit position by the ticket material posterior to said cutter, said arm being movable upon removal of the ticket to close the circuit of the electrically operated feed device for the next actuation thereof, and control means at said entrance responsive to an incoming automobile for energizing said feed device.

7. An automobile parking facility system comprising electrically operable time stamp and ticket issuing means located at the entrance of a parking facility for access by the driver of an entering automobile, said means including a casing having a ticket outlet, a guideway in said casing having an inlet and an outlet, a strip ticket material feeding wheel disposed adjacent said guideway, a ticket cutter mechanism disposed at the outlet of said guideway, a time stamp mechanism disposed intermediate said feed wheel and said cutter mechanism, actuating means for operating said feed wheel, cutter mechanism and time stamp mechanism, and an inhibitor switch actuated by the ticket material preventing operation of said actuating means.

8. A ticket dispenser for a parking facility comprising a casing having a ticket outlet, ticket storage space within said casing, an electrically operable ticket feed mechanism disposed within said casing for moving successive tickets from said storage means to said outlet, an electrically operable ticket time recording mechanism disposed within said casing adjacent said outlet, and electrical circuit means disposed within said casing operable to energize said ticket feed mechanism and time recording mechanism to effect issuance to said outlet of a time recorded ticket.

9. A ticket dispenser for a parking facility comprising a casing having a ticket outlet, ticket storage means within said casing, an electrically operable ticket feed mechanism disposed within said casing for moving successive tickets from said storage means to said outlet, an electrically operable ticket time recording mechanism disposed within said casing adjacent said outlet, electrical circuit means disposed within said casing operable to energize said ticket feed mechanism and time recording mechanism to effect issuance to said outlet of a time recorded ticket, and vehicle responsive electrical signal means operatively associated with said electrical circuit means for initiating said ticket issuance.

10. A ticket dispenser for a parking facility comprising a casing having a ticket outlet, ticket storage means within said casing, an electrically operable ticket feed mechanism disposed within said casing for moving successive tickets from said storage means to said outlet, an electrically operable ticket time recording mechanism disposed within said casing adjacent said outlet, electrical circuit means disposed within said casing operable to energize said ticket feed mechanism and time recording mechanism to effect issuance to said outlet of a time recorded ticket, and vehicle responsive electrical signal means operatively associated with said electrical circuit means, said electrical circuit means including cycle switch means limiting the actuation of said ticket feed mechanism to a single ticket feed operation for each signal-producing vehicle.

11. A ticket dispenser for a parking facility comprising a casing having a ticket outlet, ticket storage means within said casing, an electrically operable ticket feed mechanism disposed within said casing for moving successive tickets from said storage means to said outlet, an electrically operable ticket cutter disposed in said casing adjacent said outlet, an electrically operable ticket time recording mechanism disposed within said casing adjacent said cutter, and electrical circuit means disposed within said casing operable to energize said time recording mechanism, ticket feed mechanism, and ticket cutter to effect issuance to said outlet of a time recorded ticket.

12. In combination, a ticket dispenser for a parking facility comprising a casing having a ticket outlet, ticket storage means within said casing, an electrically operable ticket feed mechanism disposed within said casing for moving successive tickets from said storage means to said outlet, an electrically operable ticket time recording mechanism disposed within said casing adjacent said outlet, normally closed vehicle barrier means adjacent said ticket dispenser, electrically controlled motor means operatively associated with said vehicle barrier means adapted to open the same, electrical circuit means disposed within said casing operable to energize said ticket feed mechanism and time recording mechanism to effect issuance to said outlet of a time recorded ticket, and electrical circuit means responsive to removal of said time recorded ticket from said outlet operatively associated with said electrically controlled motor means for controlling the opening of said vehicle barrier means.

13. A ticket dispenser for a parking facility comprising a casing having a ticket outlet, ticket storage means within said casing, an electrically operable ticket feed mechanism disposed within said casing for moving successive tickets from said storage means to said outlet, an electrically operable ticket time recording mechanism disposed within said casing adjacent said outlet, electrical circuit means disposed within said casing operable to energize said ticket feed mechanism and time recording mechanism to effect issuance to said outlet of a time recorded ticket, vehicle responsive electrical signal means operatively associated with said electrical circuit means for initiating said ticket issuance, normally closed vehicle barrier means adjacent said ticket dispenser, electrically controlled motor means operatively associated with said vehicle barrier means adapted to open and close the same, and additional electrical circuit means operatively associated with said ticket outlet and said motor control means for controlling the opening of the vehicle barrier means in response to removal of said time recorded ticket.

14. The combination set forth in claim 13 including vehicle responsive electrical signal means adjacent said vehicle barrier means adapted for vehicle actuation after passing said barrier means, and electrical circuit means operatively associated with said last signal means and said motor means in a manner adapted to effect a closing of said vehicle barrier means.

15. The combination set forth in claim 13 including a second normally open vehicle barrier means located in excess of a vehicle length ahead of said first-named vehicle barrier means relative to a vehicle approaching said parking facility, electrically controlled motor means operatively associated with said second vehicle barrier means adapted to close and open the same, said additional electrical circuit means being also adapted to simultaneously control the closing of said second barrier means.

16. The combination set forth in claim 13 including a second normally open vehicle barrier means located in excess of a vehicle length ahead of said first-named vehicle barrier means relative to a vehicle approaching said parking facility, electrically controlled motor means operatively associated with said second vehicle barrier means adapted to close and open the same, said additional electrical circuit means being also adapted to simultaneously control the closing of said second barrier means, vehicle responsive electrical signal means adjacent said first-named vehicle barrier means adapted for vehicle actuation after passing, and electrical circuit means operatively associated with said last signal means and said respective motor means in a manner adapted to control respective closing and opening of said first and second named vehicle barrier means.

References Cited in the file of this patent

UNITED STATES PATENTS

| | | |
|---|---|---|
| 1,055,869 | Brown | Mar. 11, 1913 |
| 2,015,607 | Shinn | Sept. 24, 1935 |
| 2,214,829 | Bullock | Sept. 17, 1940 |
| 2,278,357 | Madden | Mar. 31, 1942 |
| 2,312,340 | Kilpatrick | Mar. 2, 1943 |
| 2,330,872 | Diebold | Oct. 5, 1943 |
| 2,340,634 | Wiley | Feb. 1, 1944 |
| 2,528,790 | Scherer | Nov. 7, 1950 |

UNITED STATES PATENT OFFICE

CERTIFICATE OF CORRECTION

Patent No. 2,795,875                                                                June 18, 1957

Hugh G. Nutter et al.

It is hereby certified that error appears in the above numbered patent requiring correction and that the said Letters Patent should read as corrected below.

In the grant, line 2, after "Michigan," insert --assignors to Automatic Parking Devices, Inc., of Detroit, Michigan, a corporation of Michigan--; line 11, for "Hugh G. Nutter and Harold L. Miller, their heirs" read --Automatic Parking Devices, Inc., its successors--; in the heading to the printed specification, line 5, after "Mich." insert --, assignors to Automatic Parking Devices, Inc., Detroit, Mich., a corporation of Michigan--.

Signed and sealed this 22nd day of October 1957.

(SEAL)
Attest:
KARL H. AXLINE

Attesting Officer

ROBERT C. WATSON
Commissioner of Patents